(12) United States Patent
De Boer

(10) Patent No.: US 10,578,458 B2
(45) Date of Patent: Mar. 3, 2020

(54) SENSING UNIT PROVIDING FIXED ARRANGEMENT OF ENGINE POSITION SENSORS

(71) Applicant: Paul Gregory De Boer, London (CA)

(72) Inventor: Paul Gregory De Boer, London (CA)

( * ) Notice: Subject to any disclaimer, the term of this patent is extended or adjusted under 35 U.S.C. 154(b) by 357 days.

(21) Appl. No.: 15/249,596

(22) Filed: Aug. 29, 2016

(65) Prior Publication Data

US 2017/0058798 A1    Mar. 2, 2017

Related U.S. Application Data

(60) Provisional application No. 62/211,071, filed on Aug. 28, 2015.

(51) Int. Cl.
*G01M 15/06* (2006.01)
*G01D 5/14* (2006.01)

(52) U.S. Cl.
CPC .......... *G01D 5/142* (2013.01); *F02D 2400/11* (2013.01); *F02D 2400/22* (2013.01)

(58) Field of Classification Search
USPC ......................................... 73/114.26, 114.77
See application file for complete search history.

(56) References Cited

U.S. PATENT DOCUMENTS

| 6,435,154 B1* | 8/2002 | Simpson | ................... F01L 1/02 123/195 C |
| 2014/0060486 A1* | 3/2014 | Maezawa | ................ F02D 45/00 123/350 |

\* cited by examiner

*Primary Examiner* — Eric S. McCall
(74) *Attorney, Agent, or Firm* — Edgar Chana Law PC; Aaron Edgar

(57) ABSTRACT

A sensing unit that provides fixed arrangement of crankshaft and camshaft position sensors is disclosed. The sensing unit attaches to the front timing cover to replace the existing distributor so that the position of sensing unit is aligned according to the tight tolerances of the existing distributor with respect to the camshaft and crankshaft. The sensing unit has a housing with the mounting positions for the camshaft and crankshaft position sensors. The sensing unit can also include a camshaft reluctor within the housing. A crankshaft reluctor is installed onto the engine crankshaft for detection by the crankshaft sensor. The sensing unit is also installed in conjunction with a wiring harness converter that allows a different engine control unit to be used.

13 Claims, 7 Drawing Sheets

Crankshaft and Camshaft Position Sensor Signal

SENSING UNIT PROVIDING FIXED ARRANGEMENT OF ENGINE POSITION SENSORS

FIELD

The present disclosure relates generally to ignition timing systems for internal combustion engines. More particularly, the disclosure relates to a sensing apparatus that determines crankshaft and camshaft position for use with an engine control unit.

BACKGROUND

Modern internal combustion engines often use Hall effect or optical sensors that provide engine ignition timing information to an engine control unit (ECU). The use of a programmable ECU can allow modification of the engine characteristics, which is typically used to increase performance or efficiency. Older engines may have a less sophisticated or less full-featured ECU. Upgrading an ECU can be an excellent after-market route to increase performance of an engine, however, this can be difficult when the sensors and other inputs from an older engine are not compatible with the expected inputs for the new ECU. This is a particular issue with older engines that use a different distributor system and engine position signals.

For example, General Motor's (GM) LT series engines (sometimes referred to as Gen 2 or LT Family) came with a factory installed Optispark distributor. Inside the Optispark is an optical sensor and a timing disc which has two rows of notches. The first row contains 360 evenly spaced notches, the second row has 8 notches of different sizes to indicate certain cylinder position. This optical sensor and disc are what makes up the "opti" in "Optispark". The second system at work in the Optispark, the "spark" portion, is a more traditional rotor and cap distributor which distributes high tension spark to the engines spark plugs. The LT series engine's ECU used the information from the Optispark's optical sensor and timing disc to know where all the cylinders are in terms of precise engine angular rotation. Knowing the exact engine position, the LT Gen 2 ECU would then calculate and electronically tell the Optispark when to fire the high tension leads.

After the LT engines, GM developed the LS series engines (sometimes referred to as Gen 3 or LS Family). On LS series engines GM decided to do away with a rotor and cap distributor (and the problems that accompanied the Optispark design) and use a coil-per-cylinder ignition system. The optical sensor and timing disc of the Optispark were replaced with the LS series engine's new system of detecting accurate angular engine position. This new position system used a crankshaft reluctor and camshaft reluctor. The crankshaft reluctor in conjunction with a corresponding sensor produces 24 unique pulses per 360 degrees of engine rotation that the Gen 3 ECU interprets to determine engine position. For this reason, this crankshaft position signal is often referred to as the "24× signal". Similarly, the camshaft reluctor and associated sensor provides what is called the "1× signal" because it is either on for 180 degrees of camshaft rotation or off for 180 degrees of camshaft rotation. The 1× signal allows the ECU to know whether a given cylinder is on its firing stroke or intake stroke; an important piece of information due to the fact that the 24× crankshaft reluctor rotates twice per complete engine cycle. The 24× signal and 1× signal are illustrated in FIG. 7.

In order to use a Gen 3 ECU on a Gen 2 GM engine, the Gen 2 engine needs to generate the appropriate 24× crankshaft signal and 1× camshaft signal, and these signals needed to be routed to the correct input of the Gen 3 ECU. The 24× and 1× signals must be generated reliably and also accurately read by the sensors in order for the ECU to know the precise engine position. Prior art approaches to modifying these Gen 2 engines for Gen 3 ECUs is costly and labor intensive.

One known approach to modifying Gen 2 engines to produce the 24× crankshaft signal and 1× camshaft signal requires removing the engine timing cover. An exploded view of a replacement timing cover that uses this methodology is illustrated in FIG. 1. Installation requires removing the timing cover (and obstructing components). Next, the camshaft reluctor 12 and crankshaft reluctor 14 are attached to the corresponding shafts on the engine. Timing cover 10 is then reinstalled on the engine block. Timing cover 10 includes a port 16 for receiving a crank Hall effect sensor 18. A cam Hall effect sensor 20 is included on additional cover 22 that when attached to timing cover 10 positions cam Hall effect sensor 20 near camshaft reluctor 12.

Another disadvantage of the design shown in FIG. 1 is that it also difficult to adjust the relative positions of camshaft and crankshaft reluctors to the corresponding sensor because the reluctors are enclosed within the timing cover. This can make it difficult to obtain proper alignment between reluctors and the corresponding sensor.

SUMMARY

According to a first aspect, a sensing unit for detecting engine timing of an engine is disclosed. The sensing unit comprises a housing mountable onto and external to the timing cover of the engine; a camshaft sensor attached to the housing to detect rotation of a camshaft reluctor; and a crankshaft sensor attached to the housing, the crankshaft sensor for detecting rotation of a crankshaft reluctor coupled to the engine crank. In some aspects the camshaft reluctor can be rotatably attached within the housing and the camshaft reluctor is coupled to the camshaft when the sensing unit is installed. The sensing unit can also include an adjustable crankshaft sensor mount attached to the housing for mounting the crankshaft sensor to the housing. This provides fore-aft adjustment (with respect to the timing cover) of the crankshaft sensor. The sensing unit can also include a housing cover that encloses the camshaft reluctor within the housing and provides attachment for the camshaft sensor.

In some aspects, the sensing unit can have a bolt pattern of an Optispark distributor for mounting to the timing cover of a General Motors Gen 2 LT series engine. In this respect, the camshaft sensor detects one signal per rotation of the camshaft reluctor and the crankshaft sensor detects twenty-four signals per rotation of the crankshaft reluctor. The crankshaft sensor and the camshaft sensor can provide a 24× signal and 1× signal, respectively, that can be used by an engine control unit (ECU) of a General Motors Generation 3 LS series engine.

Preferably, the crankshaft reluctor and camshaft reluctor are comprised of metal, and the crankshaft sensor and camshaft sensor are Hall effect sensors. In some aspects, the crankshaft reluctor has two tracks, each of the two tracks can be 180 degrees opposed, and the crankshaft sensor can have two Hall effect sensors, each Hall effect sensor to detect one of the two tracks to generate the 24× signal.

According to a second aspect, an engine control unit signal conversion kit is disclosed. The kit provides engine control unit signals to function with a new engine control unit of an engine. The kit can include a crankshaft reluctor for coupling to an engine crank; a camshaft reluctor for coupling to an engine camshaft; a sensing unit that provides engine control unit signals as described above, and a wiring harness converter coupled to the sensing unit that re-maps the engine control unit signals to the new engine control unit. The camshaft reluctor can be rotatably attached to the housing of the sensing unit.

According to yet a third aspect, a method of installing an engine control unit signal conversion kit on a General Motors Gen 2 LT series engine is disclosed. The method comprises removing an Optispark distributor from a timing cover of the engine; installing a sensing unit using the Optispark distributor mounting arrangment; and replacing an existing crankshaft hub with a crankshaft hub having a crankshaft reluctor, the rotation of crankshaft reluctor is detected by a crankshaft sensor of the sensing unit. The sensing unit can have an adjustable crankshaft sensor mount attached to the housing, and the method can further involve adjusting the adjustable crankshaft sensor mount to align the crankshaft reluctor and crankshaft sensor. Another step, if necessary, can involve adjusting an air gap between the crankshaft sensor and the crankshaft reluctor. A General Motors LT series engine has an existing engine wiring harness that can then be connected to the sensing unit. The existing wiring harness will typically require a wiring harness converter that re-maps the engine control unit signals to a format compatible with the new engine control unit.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The term "distributor" as used herein refers mainly to electrical engine position sensing systems and not traditional electro-mechanical distributor more commonly used prior to the 1970s. Also, the term "engine control unit" or "ECU" is used to refer to microprocessor-based control system that manages engine actuators and monitors sensors. ECUs are also commonly referred to as a PCM (powertrain control module) or an ECM (engine control module).

Although some embodiments may explicitly refer to modification of a GM Gen 2 series engine, it will be understood by those of ordinary skill in the art that teachings described herein may be applied to other engine blocks to obtain engine position signals to function with another ECU.

Figure 1:
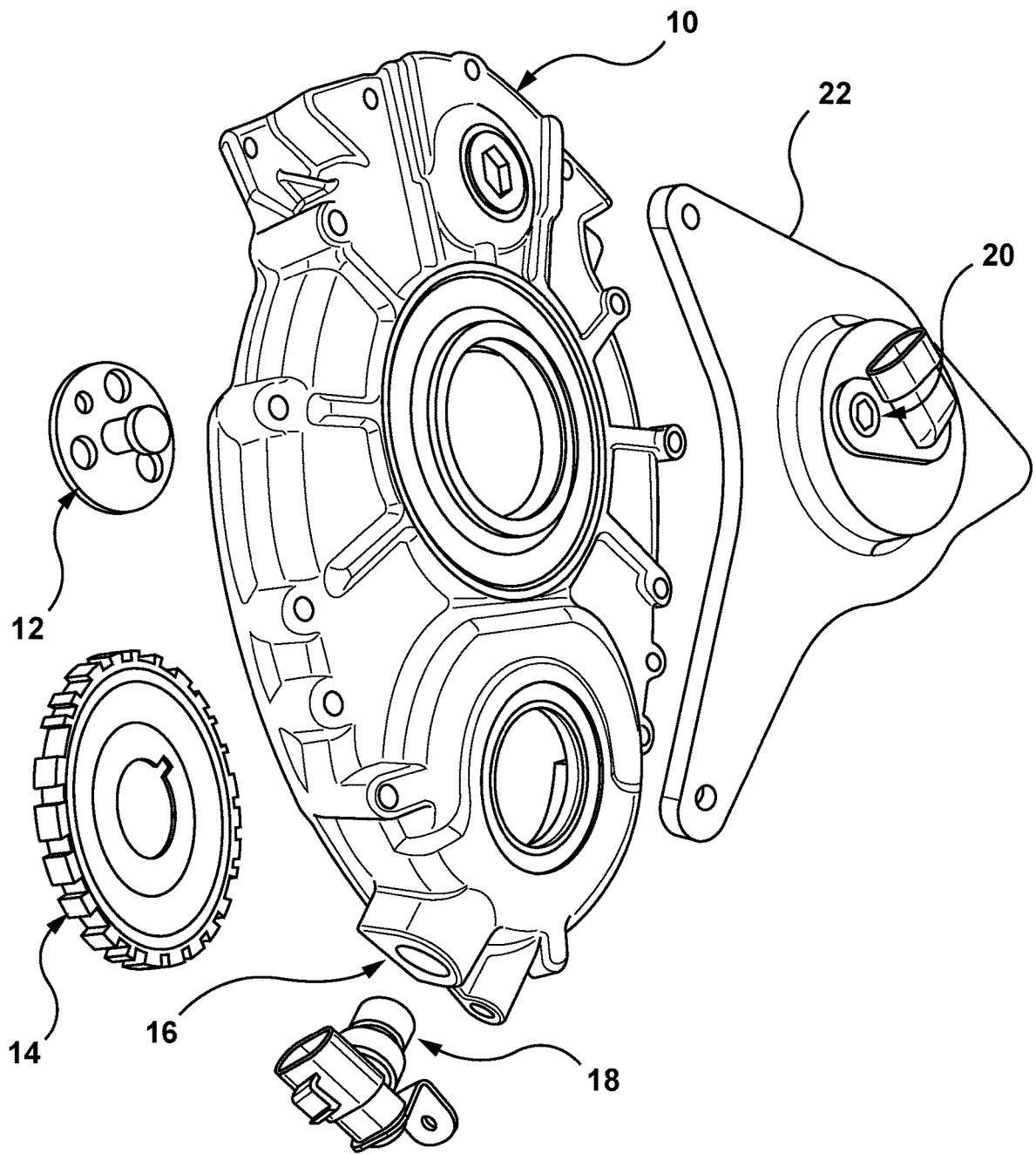
FIG. 1 is an exploded view of a replacement timing cover that encloses camshaft and crankshaft reluctors.
Figure 2:
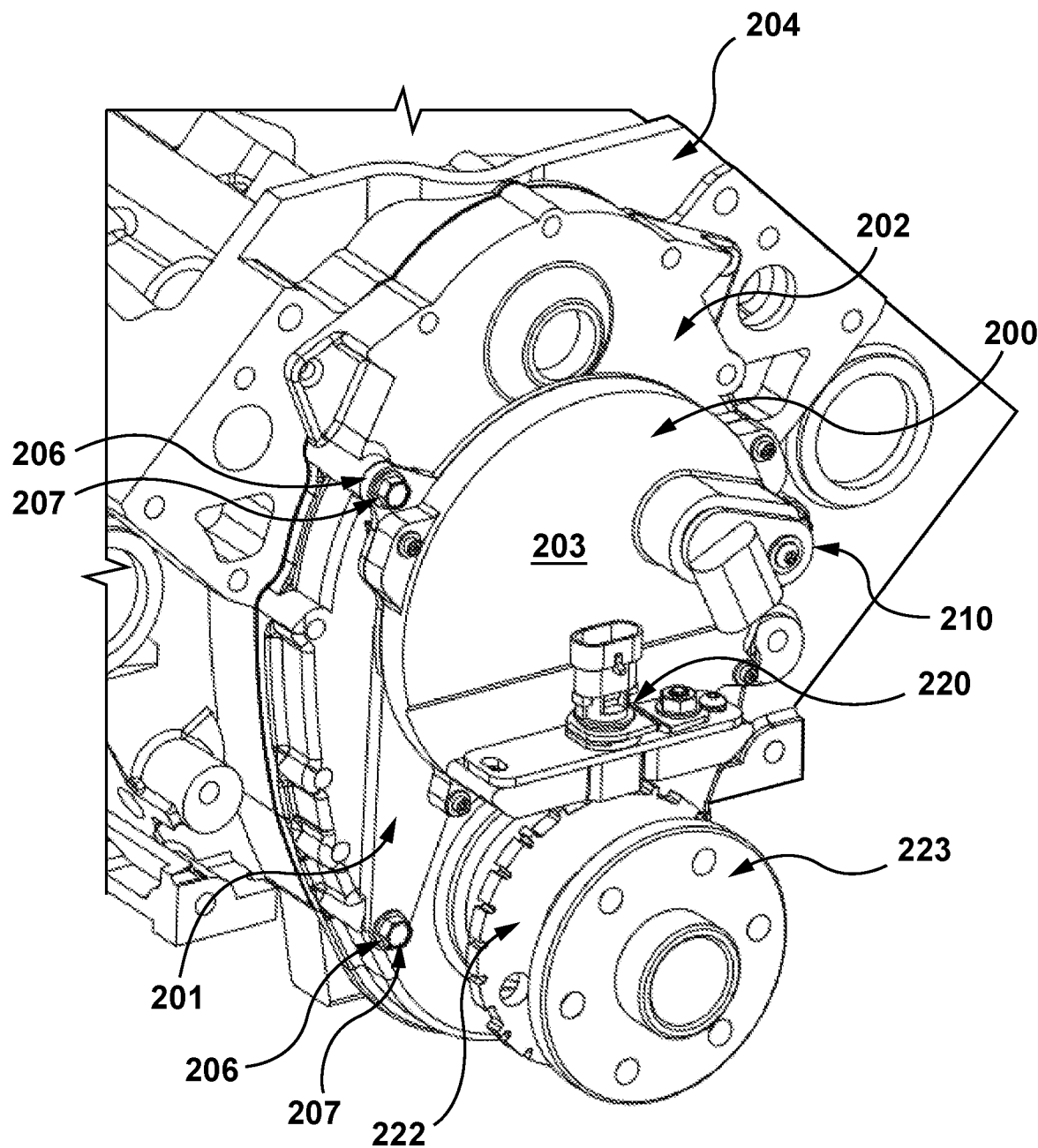
FIG. 2 is a front perspective view of a sensing unit mounted onto the front-facing external surface of the timing cover of an engine block.

Reference is first made to FIG. 2, shown is a perspective view of a sensing unit 200 mounted onto the front-facing external surface of the timing cover 202 of engine block 204. Sensing unit 200 is used for detecting the engine timing, such as the crankshaft angle (crankshaft or Top Dead Center (TDC) position), for example. This engine timing information can be used by the ECU for ignition timing, among other things.

Sensing unit 200 has a housing 201 to which a camshaft sensor 210 and a crankshaft sensor 220 are attached. A crankshaft reluctor 222 is coupled to the crank hub 223 which is coupled to the crankshaft of the engine and a camshaft reluctor 212 is coupled to the camshaft of the engine. When sensing unit 200 is attached to timing cover 202, camshaft sensor 210 is positioned near camshaft reluctor 212 and crankshaft sensor 220 is positioned near crankshaft reluctor 222.

Figure 3:
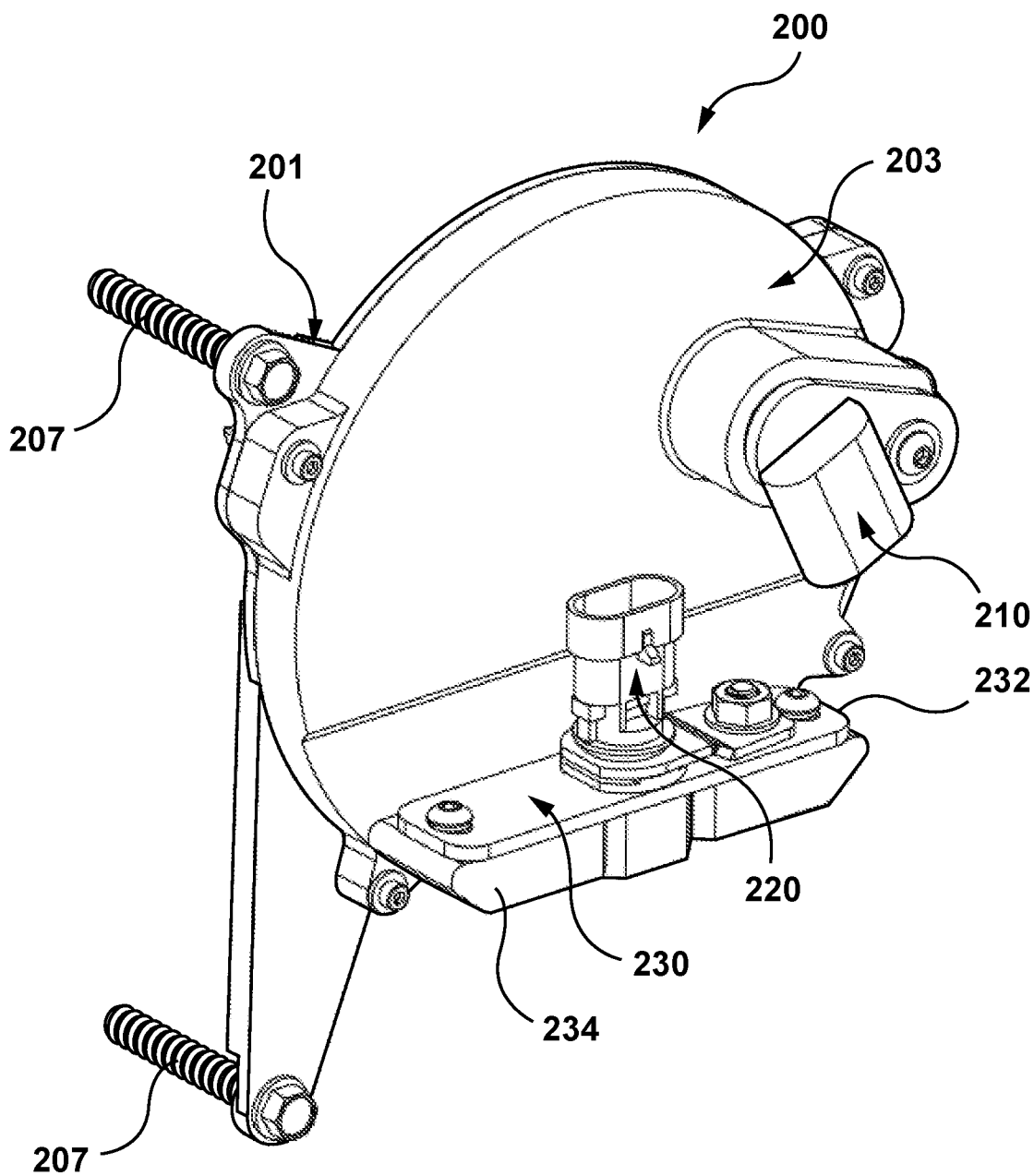
FIG. 3 is a front perspective view of the sensing unit of FIG. 2 removed from the engine block.
Figure 4:
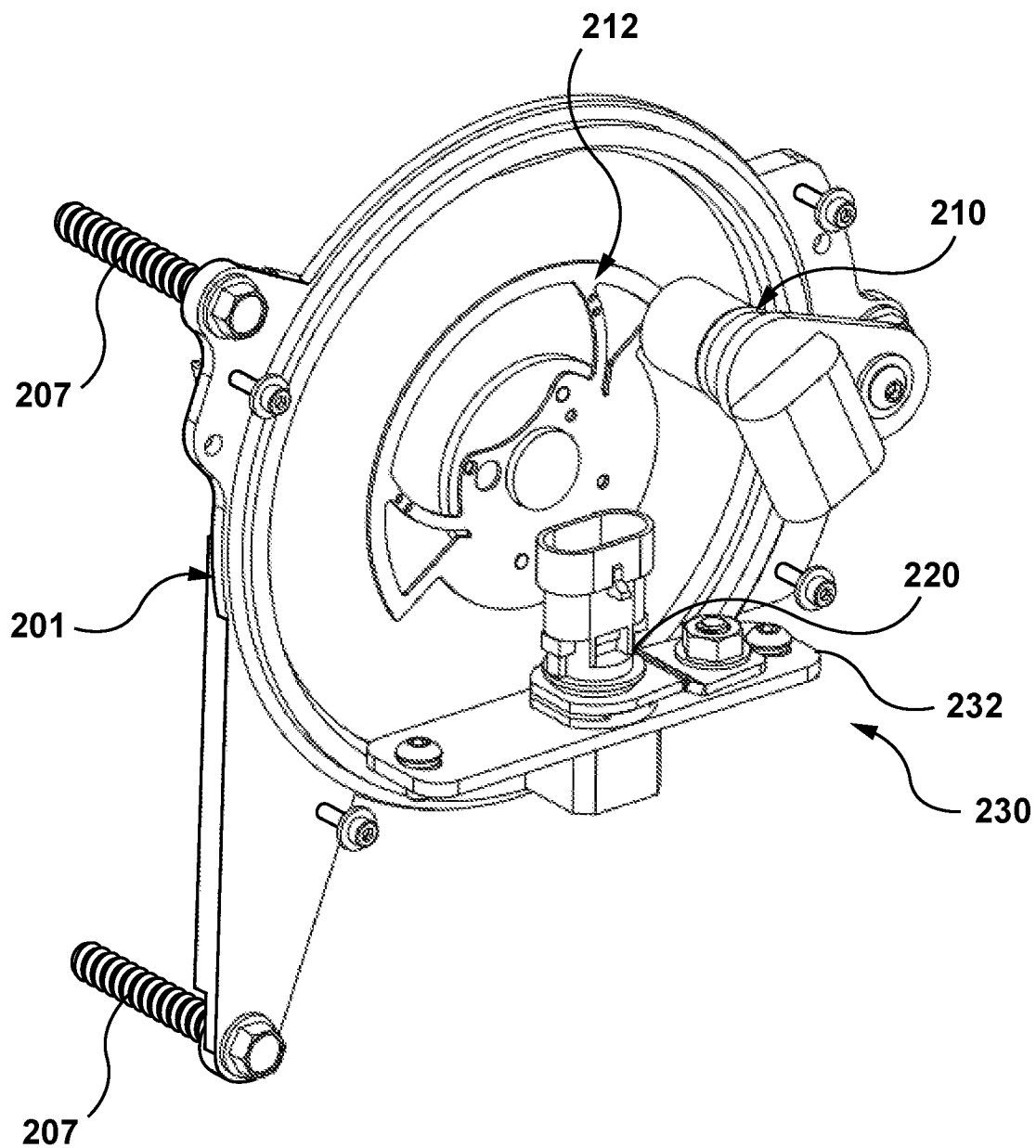
FIG. 4 is a front perspective view of the sensing unit of FIG. 3 with the housing cover removed.

Note that camshaft reluctor 212 is shown in FIG. 4 with cover 203 removed. In the embodiments illustrated in FIGS. 2-6, camshaft reluctor 212 is rotatably mounted to housing 201 and includes a mating rotor 214 that is keyed to mate with a corresponding cam drive accessible through timing cover 202. This is the preferable design because camshaft reluctor 212 can be installed with housing 201 as a single part, thus easing installation and controlling the gap between camshaft reluctor 212 and camshaft sensor 210 during manufacture of sensing unit 200. In other embodiments, camshaft reluctor 212 can be separately attached to the camshaft drive accessible through timing cover 202. Housing 201 would then provide means to allow camshaft reluctor 212 to rotate and allow camshaft sensor 210 to be positioned near camshaft reluctor 212. Housing 201 can either include a large aperture to allow camshaft reluctor 212 to be within housing 201 or extend through the back surface of housing 201, or housing 201 can include a smaller aperture to allow camshaft sensor 210 to extend to the back surface of housing 201.

Sensing unit 200 is designed to replace the original distributor and is mounted to the front of timing cover 202 using same mounting arrangement as the original distributor. For example, timing cover 202 illustrated in FIGS. 2-6 have three threaded mounting apertures 206 for receiving mounting bolts 207 to attach sensing unit 200. This provides a highly accurate mounting position for camshaft sensor 210 and crankshaft sensor 220. Mounting crankshaft sensor 220 in this manner allows the arrangement of crankshaft reluctor 222 to crankshaft sensor 220 to have a very tight tolerance. On the engine block, the crank centerline and camshaft centerline have a very tight tolerance. Attaching camshaft reluctor 212 as part of housing 201 when mounting sensing unit 200 to timing cover 202 provides a tight tolerance for the gap between camshaft reluctor 212 and camshaft sensor 210.

The embodiment illustrated in FIGS. 2-6 are a GM Gen 2 series engine where the original Optispark distributor that was installed on the timing cover is removed and replaced with sensing unit 200. The pattern for the mounting bolts 207 on sensing unit 200 are the same as that of the original Optispark distributor. Other embodiments can be configured to work with other engines using other mounting arrangements to attach to the timing cover.

Referring to FIG. 3, shown is a perspective view of sensing unit 200 removed from the engine 204 that better illustrates an adjustable crankshaft sensor mount 230. Some embodiments of sensing unit 200 can include an adjustable crankshaft sensor mount 230 that has a mounting plate 232 that is bolted to a crankshaft bracket 234 that is attached to housing 201. Mounting plate 232 has crankshaft sensor 220 securely attached. Crankshaft bracket 234 can have oblong mounting apertures in the fore-aft direction to allow mounting plate 232 to be moved forward or backwards relative to timing cover 202 and then secured in position thus achieving perfect alignment of the crank sensor over top of the crankshaft reluctor.

Camshaft sensor 210 and crankshaft sensor 220 are electronic devices that are able to monitor the position and rotational speed for the crank and cam, respectively. Camshaft and crankshaft sensors 210, 220 include a connector that allows it to be connected to the engine wiring harness that connects the sensors to the ECU. Crankshaft sensor 220 provides the speed and position of the pistons and camshaft sensor 210 provides the position of the valves. The ECU uses this information for timing the injection of the fuel into each engine cylinder and timing when to fire cylinder spark plugs. Preferably, camshaft sensor 210 and crankshaft sensor 220 are Hall effect sensors that can detect the presence or absence of the nearby metal. Other embodiments could use optical sensors or inductive sensors but these are less preferable because they are not as accurate or rugged as Hall effect sensors.

Figure 6:
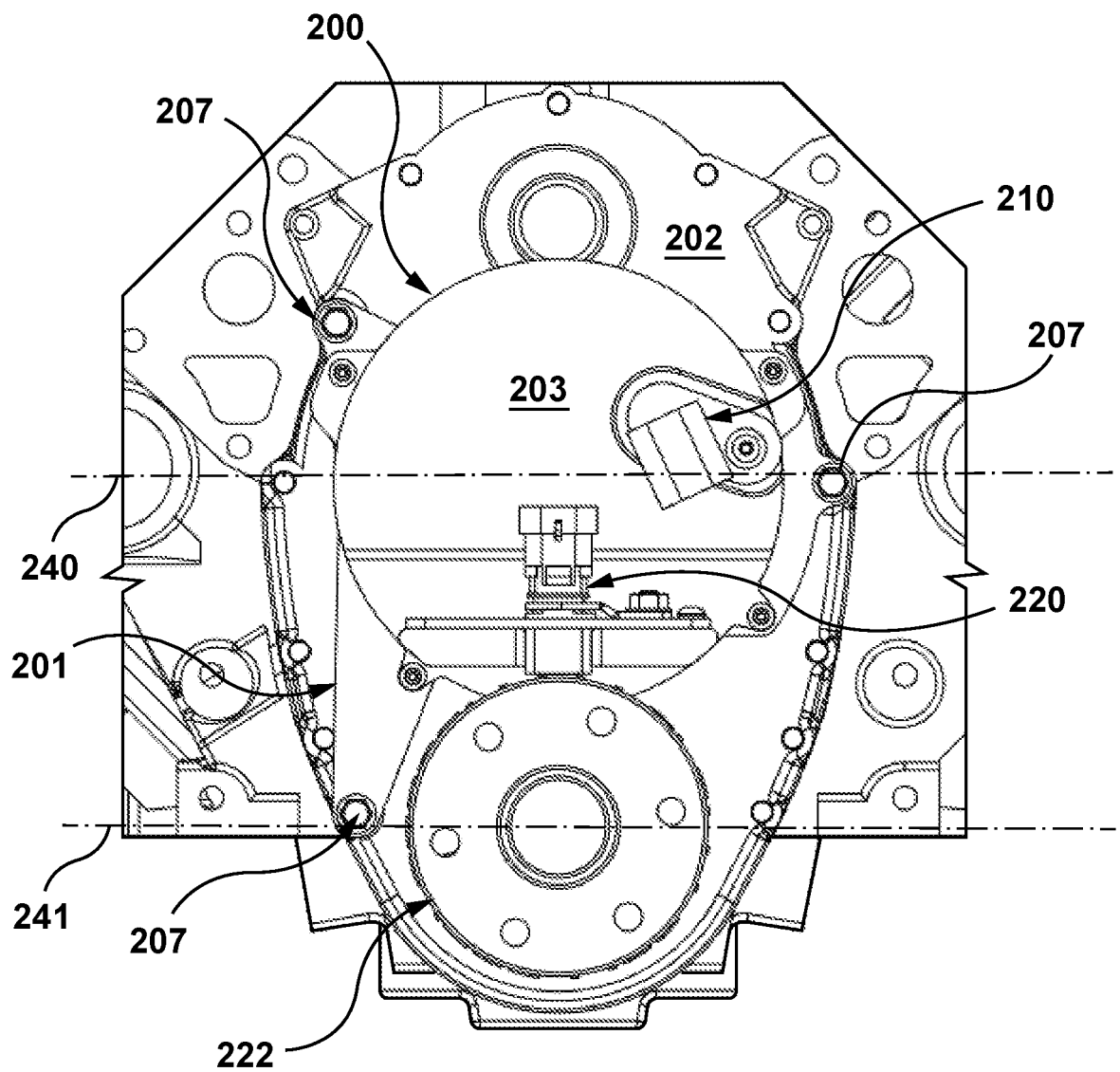
FIG. 6 is a front view of the sensing unit of FIG. 2 shown installed on the timing cover of the engine block.
Figure 7:
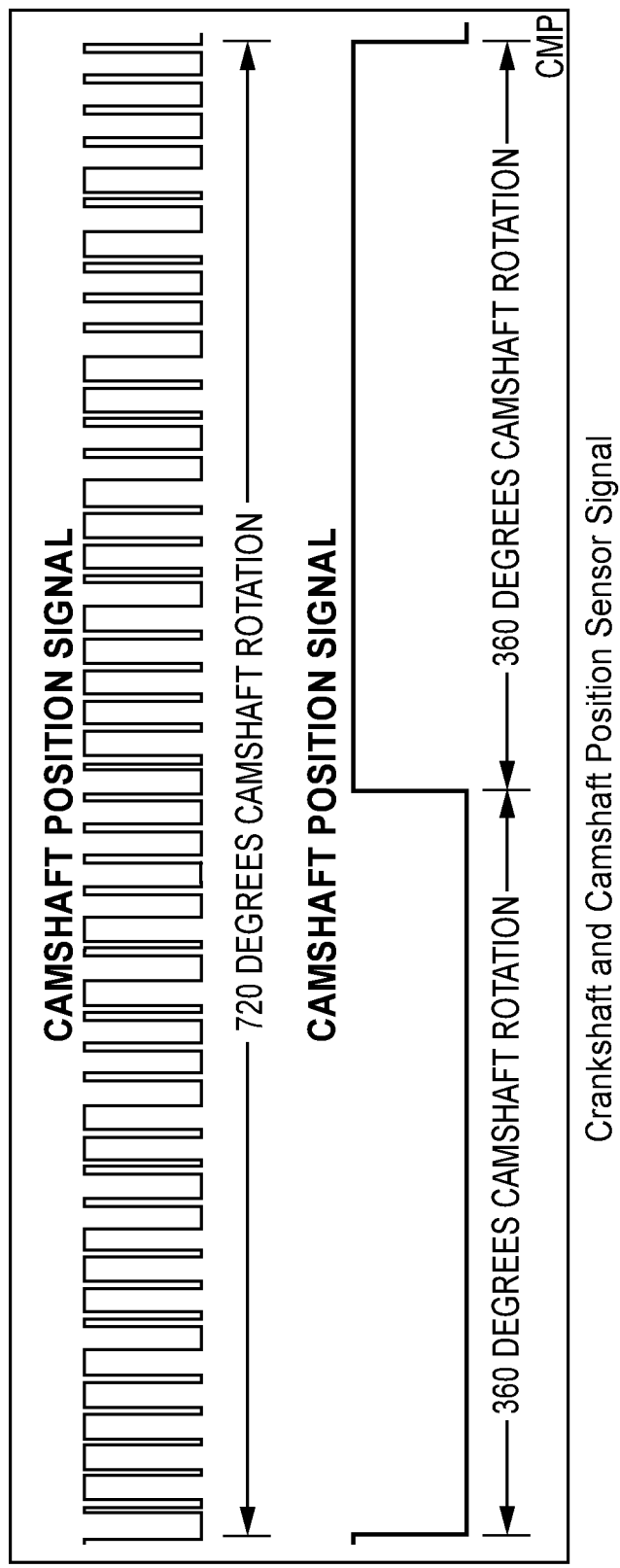
FIG. 7 is an illustration of the 24× crankshaft position signal and 1× camshaft position signal used with GM Gen 3 LS series engines.

Crankshaft reluctor 222 has a series of metallic teeth around its outer circumferential surface that can be detected by crankshaft sensor 220. Crankshaft reluctor 222 can also have a keyway that aligns with a key on engine crankshaft to correctly position crankshaft reluctor 222. The number of teeth, the size of the teeth, and the spacing between the teeth will affect the signal from crankshaft sensor 222. The GM Gen 3 series engines have a 24 tooth crankshaft reluctor that produce a crankshaft positional signal with 24 pulses from the crankshaft position sensor for every rotation of the crankshaft. This signal is referred to as a 24× crankshaft position signal and is illustrated in FIG. 7. The embodiment illustrated in FIGS. 2-6 use a 24× crankshaft reluctor 222 attached to the crank of a GM Gen 2 series engine that allows crankshaft sensor 220 to produce a 24× crankshaft positional signal for GM Gen 3 series ECU. Other embodiments can use a different crankshaft reluctor tooth pattern to produce the required crankshaft positional signal for the selected ECU. For example, a 58 tooth crankshaft reluctor can be used with newer GM or GM-compatible ECUs that expect a 58× crankshaft positional signal.

In some embodiments, crankshaft reluctor 222 can be dual track where it includes two separate sets of teeth around the circumference of crankshaft reluctor 222. Crankshaft sensor 220 would then include two separate Hall effect sensors, each dedicated to one track. The tooth pattern of the second track can be the inverse of the first track, or the tooth pattern of the second track can be offset from the first set by a certain number of degrees, such as 180 degrees. Using a dual track reluctor can provide improved accuracy and faster engine starts.

Camshaft reluctor 212 can be a disc that is coupled to the engine cam. The disc should be designed such that camshaft sensor 210 can only detect the disc through 180 degrees of rotation and is not able to detect the disc through the remaining 180 degrees of rotation. This allows camshaft sensor 210 to produce 1× camshaft positional signal that has a single pulse through 360 degrees of camshaft rotation. This camshaft positional signal is illustrated in FIG. 7. Referring to FIG. 4, an embodiment of a camshaft reluctor disc is shown that has an increased radius over half the disc that can be detected by camshaft sensor 210. Other embodiments can include a disc with a non-metallic slot or cutout that extends 180 degrees around the disc that is positioned near camshaft sensor 210. Other embodiments can use a different camshaft reluctor tooth pattern to produce the required camshaft positional signal for the selected ECU. For example, a 4× tooth camshaft reluctor can be used with newer GM or GM-compatible ECUs that expect a 4× camshaft position signal. Sensing unit 200 can include a housing cover 203 (shown removed in FIG. 4) that encloses camshaft reluctor 212 within housing 201 of sensing unit 200.

Figure 5:
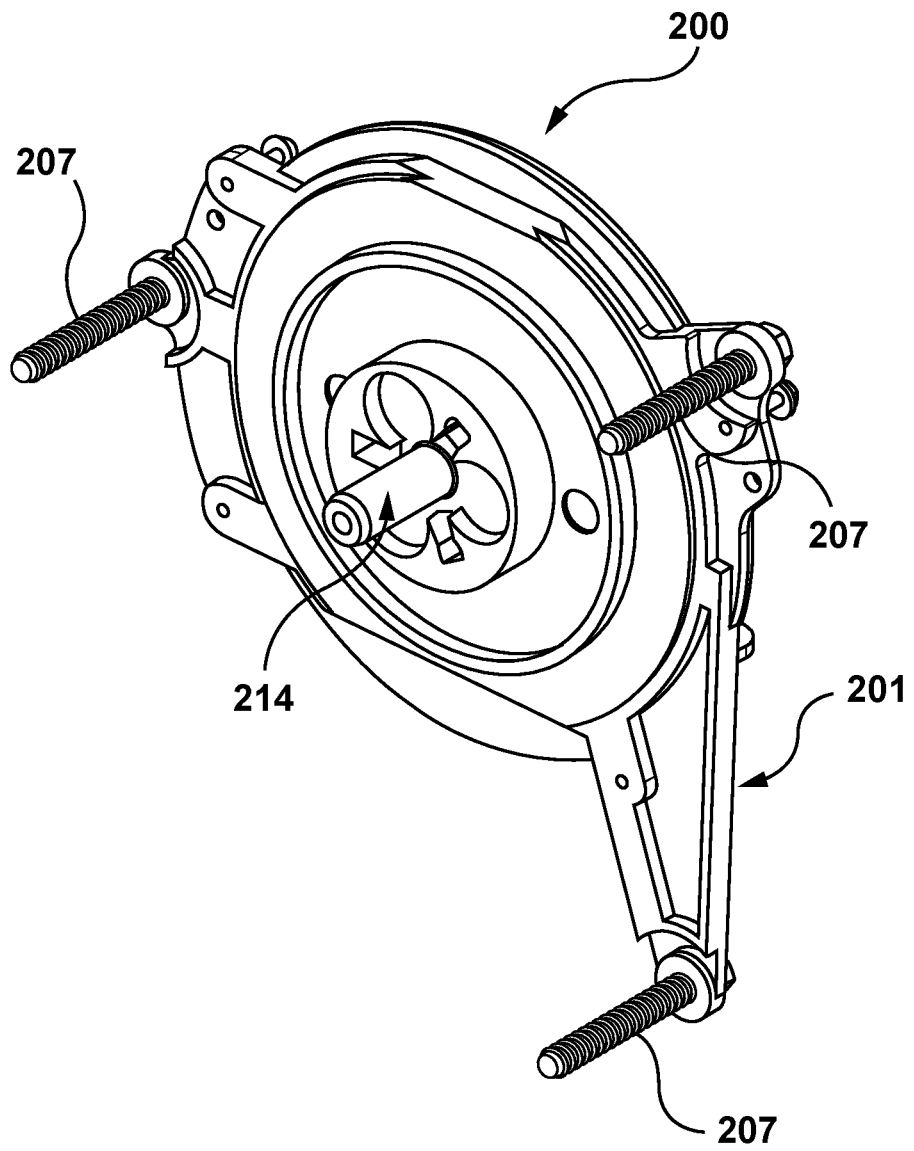
FIG. 5 is a rear perspective view of the sensing unit of FIG. 4.

Camshaft reluctor 212 will also include an alignment mechanism to mate with the engine camshaft drive so that camshaft reluctor is positioned correctly. For example, an index tab on the camshaft drive can mate with a tab on camshaft reluctor 212. Another example could include a dowel pin used with the camshaft drive that mates with a locking hole on camshaft reluctor 212. In embodiments where camshaft reluctor 212 is integral with housing 201 of sensing unit, the alignment mechanism can be provided on mating rotor 214 as shown in FIG. 5. The embodiment shown in FIG. 5 is designed to mate with a pin drive or clover drive on later year GM Gen 2 series engines that have an extending dowel pin used for alignment. Another embodiment can be designed to mate with the spline drive mechanism on early year GM Gen 2 series engines.

Sensing unit 200 is typically provided in a conversion kit that can be used to with an older engine to convert its crank and cam position signals to function with another, typically newer, ECU. The conversion kit will include a camshaft reluctor and crankshaft reluctor for coupling to the engine crank and engine cam, a sensing unit 200 that includes the crankshaft and camshaft sensors mounted thereto, and a wiring harness converter that is coupled to the sensing unit 200 and re-maps the electrical signals for the new engine control unit. Camshaft reluctor 212 can be integral with sensing unit 200 and rotatably attached to the housing 201, as shown in FIGS. 2-6, or as a separate part requiring separate installation prior to mounting sensing unit 200.

The wiring harness converter allows the wiring harness of the existing engine to be used but remaps the signals to the inputs expected by the new ECU. This wiring conversion or signal rerouting can be accomplished with an adaptor that attaches to the wiring harness prior to connecting with the ECU. Wiring harness conversion can also be integrated with a new ECU that is specifically designed for the particular harness and sensing unit kit. Other embodiments can include wiring conversion integrated into the sensors of sensing unit 200.

Wiring harness converter for use with a GM Gen 3 ECU can be constructed by modifying the Gen 3 ECU to implement the wiring harness conversion. The faceplate of the Gen 3 ECU can be replaced with a faceplate for a Gen 2 ECU that includes the connectors for the existing engine wiring harness. The faceplate can include a printed circuit board that remaps the signals received from the wiring harness connectors and connects them to the appropriate inputs on the printed circuit board of the Gen 3 ECU.

Converting a GM Gen 2 LT series engine to use a new ECU involves installing the engine control unit signal conversion kit and connecting it to the new ECU. The first step is to remove the existing Optispark distributor from the front of the timing cover of the engine block. This step also requires removing the components that obstruct the distributor such as the water pump, serpentine drive belt, the crank pulley, and also disconnecting the engine wiring harness. The Optispark is removed by removing the three bolts that secure it to the front timing cover. The engine can then be rotated to ease the installation of sensing unit 200 so that mating rotor 214 is easier to align with the cam drive of the engine. Sensing unit 200 can then be placed onto the front timing cover and secured into place using three bolts in the same position as those used to secure the Optispark distributor. The existing crankshaft hub is also replaced with a crankshaft hub having a crankshaft reluctor 222 that can be detected by the crankshaft sensor 220 of sensing unit 200.

Using the Optispark base mounting arrangement provides a very accurate crankshaft sensor position without the need for separate mounting arms or components. The distance between the crank bore and cam bore has a very tight tolerance and the Optispark distributor is positioned very accurately relative to the crank and cam bore. By using the same mounting arrangement, sensing unit 200 is able to position the camshaft and crankshaft position sensors very accurately on the face of the timing cover. FIG. 6 illustrates a front view of sensing unit 200 installed on timing cover 202 of engine 204 with the center lines of the camshaft and crankshaft denoted by horizontal lines 240, 241, respectively. Mounting sensing unit 200 using bolts 207 into the original Optispark mounting position provides tight tolerances for camshaft sensor 210 and crankshaft sensor 220.

Sensing unit 200 can include an adjustable crankshaft sensor mount that includes adjustment in the fore-aft directions that can assist with the final alignment of crankshaft sensor 220. The air gap between the crankshaft sensor 220 and crankshaft reluctor 222 can also be adjusted using shims, if required, to obtain the correct air gap.

After the mechanical parts of the sensing unit 200 are installed the wiring harness can be connected. In order to use a Gen 3 ECU with a Gen 2 engine, a wiring harness converter is required to be connected to the wiring harness to re-map the engine control unit signals to the new engine control unit. The wiring harness and wiring harness converter can then be connected to the new Gen 3 ECU.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A sensing unit for detecting engine timing of a General Motors LT series engine having a camshaft, crankshaft, and a timing cover, the sensing unit comprising:
    a housing mountable onto and external to the timing cover, the housing having a bolt pattern of an Optispark distributor for mounting to the timing cover;
    a camshaft sensor attached to the housing to detect rotation of a camshaft reluctor; and
    a crankshaft sensor attached to the housing, the crankshaft sensor for detecting rotation of a crankshaft reluctor coupled to the engine crank.

2. The sensing unit of claim 1, further comprising a housing cover to enclose the camshaft reluctor within the housing and to provide attachment for the camshaft sensor.

3. The sensing unit of claim 1 wherein the camshaft reluctor is rotatably attached to the housing, the camshaft reluctor coupled to the camshaft.

4. The sensing unit of claim 3 further comprising an adjustable crankshaft sensor mount attached to the housing for mounting the crankshaft sensor to the housing.

5. The sensing unit of claim 4, wherein the camshaft sensor detects one signal per rotation of the camshaft reluctor.

6. The sensing unit of claim 5, wherein the crankshaft sensor detects twenty-four signals per rotation of the crankshaft reluctor.

7. The sensing unit of claim 6, wherein the crankshaft reluctor and camshaft reluctor are comprised of metal and the crankshaft sensor and camshaft sensor are hall effect sensors.

8. The sensing unit of claim 6, wherein the crankshaft sensor and the camshaft sensor provide a 24× signal and 1× signal, respectively, that can be used by an engine control unit (ECU) of a General Motors Generation 3 engine.

9. The sensing unit of claim 8, wherein the crankshaft reluctor has two tracks, each of the two tracks are 180 degrees opposed, and the crankshaft sensor has two Hall effect sensors, each Hall effect sensor to detect one of the two tracks to generate the 24× signal.

10. An engine control unit signal conversion kit, the kit for providing engine control unit signals to function with a new engine control unit of an engine, the kit comprising:
    a crankshaft reluctor for coupling to an engine crank;
    a camshaft reluctor;
    a sensing unit that provides engine control unit signals, the sensing unit comprising:
        a housing mounted onto and external to a timing cover of the engine;
        a camshaft sensor attached to the housing to detect rotation of the camshaft reluctor, and a crankshaft sensor attached to the housing, the crankshaft sensor for detecting rotation of the crankshaft reluctor coupled to an engine crank, the camshaft sensor and crankshaft sensor providing the engine control unit signals; and
    a wiring harness converter coupled to the sensing unit that re-maps the engine control unit signals to the new engine control unit.

11. The engine control unit signal conversion kit of claim 10 wherein the camshaft reluctor is rotatably attached to the housing, the camshaft reluctor coupled to a camshaft of the engine.

12. An engine control unit signal kit, the kit for providing engine control unit signals to function with an engine control unit of an engine, the kit comprising:
    a crankshaft reluctor for coupling to an engine crank;
    a camshaft reluctor;
    a sensing unit that provides engine control unit signals, the sensing unit comprising:
        a housing mounted onto and external to a timing cover of the engine, the housing having a bolt pattern of an Optispark distributor for mounting to the timing cover;

a camshaft sensor attached to the housing to detect rotation of the camshaft reluctor, and a crankshaft sensor attached to the housing, the crankshaft sensor for detecting rotation of the crankshaft reluctor coupled to an engine crank, the camshaft sensor and crankshaft sensor providing the engine control unit signals.

13. The engine control unit signal kit of claim 12 wherein the camshaft reluctor is rotatably attached to the housing, the camshaft reluctor coupled to a camshaft of the engine.

* * * * *